United States Patent [19]

Sawagata

[11] 4,095,259
[45] June 13, 1978

[54] VIDEO SIGNAL CONVERTING SYSTEM HAVING QUANTIZATION NOISE REDUCTION

[75] Inventor: Kiyoshi Sawagata, Yokohama, Japan

[73] Assignee: Sony Corporation, Tokyo, Japan

[21] Appl. No.: 698,003

[22] Filed: Jun. 21, 1976

[30] Foreign Application Priority Data

Jun. 24, 1975 Japan .................................. 50-77973

[51] Int. Cl.$^2$ ......................... H04N 7/04; H04N 5/78
[52] U.S. Cl. ..................................... 358/141; 360/36; 358/133
[58] Field of Search ...................... 358/8, 13, 133, 138, 358/167, 141; 360/36; 325/38 R, 42

[56] References Cited

U.S. PATENT DOCUMENTS

| | | | |
|---|---|---|---|
| 2,625,604 | 1/1953 | Edson | 325/38 R |
| 3,244,808 | 4/1966 | Roberts | 358/133 |
| 3,476,875 | 11/1969 | Davis | 325/42 |
| 3,562,420 | 2/1971 | Thompson | 358/138 |
| 3,699,446 | 10/1972 | Sainte-Beuve | 178/68 |
| 3,739,082 | 6/1973 | Lipple | 358/138 |
| 3,860,952 | 1/1975 | Tallent et al. | 358/8 |
| 3,949,170 | 4/1976 | Shionoya | 358/133 |
| 3,999,129 | 12/1976 | Kasson | 325/65 |

Primary Examiner—John C. Martin
Attorney, Agent, or Firm—Lewis H. Eslinger; Alvin Sinderbrand

[57] ABSTRACT

In a system in which a video signal is converted into a digitized signal, clamp levels thereof at every horizontal synchronizing interval are randomly shifted before conversion, whereby quantization noise signals can be scattered on a displayed image by reclamping after a reconversion of the signal.

6 Claims, 2 Drawing Figures

VIDEO SIGNAL CONVERTING SYSTEM HAVING QUANTIZATION NOISE REDUCTION

BACKGROUND OF THE INVENTION

1. Field of the Invention

The present invention relates generally to a video signal converting system suitable for converting a video signal into a digitized signal, and is directed more particularly to a video signal converting system in which quantization noise signals produced when a video signal is quantized can be reduced.

2. Description of the Prior Art

In general, when a video signal is converted into a digitized signal, or digital signal, and transmitted and transmitted digitized signal is later converted back into an analog signal to reproduce a television picture, the points that, in the picture, correspond to quantized levels of the video signal during the horizontal period tend to be arranged in the horizontal direction as quantized noise signals which cause a longitudinal stripe pattern or longitudinal stripes in the reproduced picture.

It has previously been proposed to "wobble" the video signal, that is, to vary the amplitude of the video signal to be converted into a digitized signal. The purpose of doing so is to avoid the formation of the longitudinal stripe pattern. In that case, however, the S/N (signal to noise) ratio of the video signal is deteriorated, or impaired by wobbling the video signal.

It is possible to eliminate the quantized noise signals by increasing the bit number of conversion. However, this makes the whole the system more complicated to construct. Further, some of the quantized noise signals cannot be eliminated by merely increasing the bit number of conversion.

SUMMARY OF THE INVENTION

It is an object of the invention to provide a novel video signal converting system free from the defects inherent in the prior art.

It is another object of the invention to provide a video signal converting system in which a stripe pattern caused by quantized noise signals is avoided and the S/N ratio of the video signal is not impaired.

According to one aspect of the video signal converting system of the invention, when an incoming video signal is converted into a digitized or digital signal by using a clamp circuit and an analog to digital (A-D) converter, the incoming video signal is clamped at random voltage levels by the clamp circuit at every horizontal interval or period. In this case, the converting range of the A-D converter is to be designed in consideration of the maximum shift amount. Further, according to the invention, after the video signal is reconverted, it it necessary to pass the reconverted video signal through a clamp circuit which will clamp the reconverted video signal at a predetermined level. Thus, the quantized signals can be scattered at random without deteriorating the S/N ratio of the signal.

Other objects, features and advantages of the present invention will be apparent from the following description taken in conjunction with the accompanying drawings.

DESCRIPTION OF THE PREFERRED EMBODIMENT

An example of the video signal converting system according to the present invention will be hereinafter described with reference to FIG. 1 in which the invention is employed as a time base error corrector of a video signal.

Figure 1:
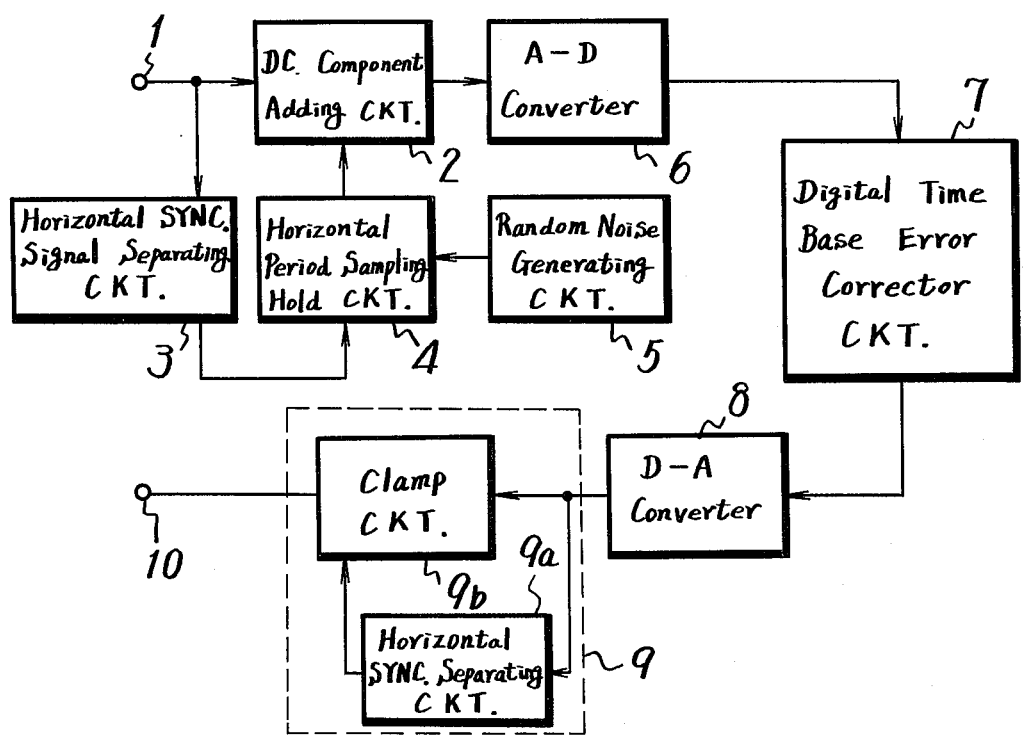
FIG. 1 is a block diagram showing an example of the video signal converting system according to the invention.

In FIG. 1, reference numeral 1 designates a video signal input terminal to which is supplied a video signal from, for example, a video tape recorder. The video signal supplied to the video signal input terminal 1 is applied to a DC component adding circuit 2 and to a horizontal synchronizing signal separating circuit 3. The horizontal synchronizing signal obtained at the output side of the horizontal synchronizing signal separating circuit 3 is supplied, as a sampling signal, to a horizontal period sample-and-hold circuit 4 to which a random noise signal from a random noise generating circuit 5 is also supplied. Thus, the horizontal period sample-and-hold circuit 4 samples the random noise signal with the horizontal synchronizing signal and holds the level of the random noise signal at that time until the following horizontal synchronizing signal is applied thereto. The output signal from the horizontal period sample-and-hold circuit 4 is a DC voltage, the level of which is shifted, or changed, at every horizontal period, and this DC voltage with a shifting level is supplied to the DC component adding circuit 2.

In the above description, it is assumed that a clamped or DC restored video signal returned to a single, fixed voltage level, as is commonly done, is supplied to the video signal input terminal 1, so that the DC component adding circuit 2 is employed to supply the DC voltage with a shifting level. However, if the output signal from the DC component adding circuit 2 is considered, it will be recognized that the same result is obtained as if the video signal were clamped at different levels.

The video signal obtained from the DC component adding circuit 2 and having a DC component that is different at every horizontal period is supplied to an A-D converter 6 which converts the analog video signal into a digital video signal. The A-D converter 6 is selected to convert the input analog signal into a digital signal of 8 bits (256 steps). The output signal from the A/D converter 6 is supplied to a digital time base error corrector circuit 7 in which plural sets, for example three sets, of shift register groups are provided. The digital video signals converted from the analog video signals are successively written into the shift register groups with a write-in clock signal which follows up the time base error (jitter) of the video signals; and the written-in digital video signals are successively read out from the shift register groups with a reading out reference clock signal of a normal time interval with a delay time of about 1.5 horizontal period from the write-in time of the video signal to the shift register groups to provide a digital video signal with no time base error.

The output digital video signal from the digital time base error corrector circuit 7 is supplied to a D-A (digital to analog) converter 8 which converts the digital signal into an analog video signal. The analog video signal obtained at the output side of the D-A converter 8 is delivered through a DC component restoring circuit 9 to an output terminal 10. The DC component restoring circuit 9 is formed of, for example, a horizontal synchronizing separating circuit 9a and a clamp circuit 9b. The output signal from the D-A converter 8 is supplied to both the horizontal synchronizing separating circuit 9a and the clamp circuit 9b, and the horizontal synchronizing signal obtained from the synchronizing separating circuit 9a is applied to the clamp circuit 9b. Thus, the level of the pedestal of the horizontal synchronizing signal in the video signal is clamped at a constant value by the clamp circuit 9b with the horizontal synchronizing signal being supplied thereto from the circuit 9a as the clamping signal.

Figure 2:
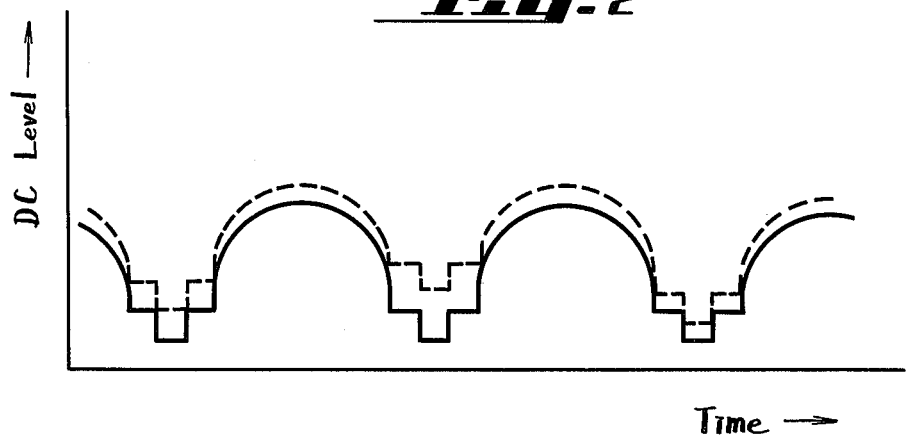
FIG. 2 shows signal waveforms used for explaining the operation of the system shown in FIG. 1.

With the system of the invention constructed as above, when a video signal having a waveform as shown by a solid line in FIG. 2, for example, is applied to the input terminal 1, a DC voltage is obtained at the output side of the horizontal period sample-and-hold circuit 4, and the level of this DC voltage is randomly shifted or changed at every horizontal period. Therefore, at the output side of the DC component adding circuit 2 there is obtained a video signal having a DC level shifted or changed randomly at every horizontal period and thus having the waveform shown in FIG. 2 by a dotted line. The video signal having a DC level that is changed randomly at every horizontal period is fed to the A-D converter 6 to be converted into a digital signal. The digital signal from the A-D converter 6 is fed to the digital time base error corrector circuit 7 and the output signal therefrom is applied to the D-A converter 8. Accordingly, at the output side of the D-A converter 8, there is produced the video signal the time base error of which is corrected as shown in FIG. 2 by the dotted line, and at the output side of the DC component restoring circuit 9 there is obtained the video signal the DC component of which is restored as shown in FIG. 2 by the solid line.

When the video signal is converted into a digital signal and its DC level is changed randomly at every horizontal period, in accordance with this invention this signal is transmitted and then reconverted into an analog signal or video signal and DC-restored. Therefore, the changing points of quantized levels of the video signals in the horizontal period are positioned at random with respect to the vertical direction of the television picture. Thus, a picture reproduced from the video signal obtained at the output terminal 10 is free from a longitudinal stripe pattern since the changing points of quantized levels are changed at random with respect to the vertical direction as just mentioned above.

Further, the invention does not require a wobbling signal to be added to the video signal as described above, so the S/N ratio of the video signal is not deteriorated.

In the above described example of the invention, the DC component of the video signal is changed at every horizontal period, but it will be easily understood that even if the DC component of the video signal is changed only at every vertical period, the same effect can be achieved due to the persistence of vision.

The above description is given on a single preferred embodiment of the invention, but it will be apparent that many modifications and variations could be effected by those skilled in the art without departing from the true scope of the present invention. Therefore, the true scope of the invention should be determined by the appended claims.

I claim as my invention:

1. A video signal converting system comprising:
    circuit means for receiving an analog video signal that includes a DC level and having respective information intervals;
    level shifting means connected to said circuit means to shift the DC level of said video signal to different random values at equally spaced intervals, said level shifting means comprising random noise generating means for generating a noise signal having a level which changes randomly from one information interval to the next and which remains constant throughout each respective information interval, and means for changing the DC level of said video signal in successive information intervals with said noise signal such that said video signal DC level is constant throughout a respective information interval and then changes in the next successive interval;
    digitizing means connected to said level shifting means to receive therefrom the analog video signal with the shifted DC level;
    signal utilization means for receiving and utilizing the digitized level-shifted video signal from said digitizing means;
    converting means connected to said signal utilization means for receiving and converting the digitized video signal to an analog level-shifted video signal; and
    clamping means connected to said converting means to restore said analog video signal to its original DC level.

2. A video signal converting system as claimed in claim 1 in which said level shifting means includes a clamping circuit, the clamp level of said clamping circuit being shifted at each of the information intervals in accordance with the level of said generated noise signal.

3. A video signal converting system as claimed in claim 1 in which the analog video signal received by said circuit means is DC restored to a fixed voltage, and said level shifting means
    includes an adding circuit connected to said random noise generating means and to said circuit means to add said generated noise signal to the video signal.

4. A video signal converting system as claimed in claim 1 wherein said converting means is a digital to analog converter;
    to reconvert the digitized signal to an analog video signal including synchronizing signals separating successive information intervals; and
    said clamping means clamps the reconverted analog video signal to a fixed voltage level at the successive information intervals.

5. A video signal converting system as claimed in claim 4 comprising a horizontal synchronizing signal separating circuit connected to said digital to analog converter to receive the reconverted analog video signal therefrom and connected to said clamping circuit to supply separated horizontal synchronizing signals thereto as clamping signals.

6. A video signal converting system comprising:
    circuit means for receiving an analog video signal that includes a DC level;
    setting means connected to said circuit means to set the DC level at different values at the horizontal synchronizing signal intervals of the video signal, said setting means comprising a horizontal synchronizing signal separator circuit connected to said circuit means to receive the video signal therefrom, a random noise generator to generate a noise signal having a random value to be combined with the video signal at each of the horizontal synchronizing signal intervals of the video signal, and a horizontal interval sample-and-hold circuit connected to said random noise generator to receive the noise signal therefrom and connected to said separator circuit to sample the noise signal at every horizontal synchronizing signal interval; and digitizing means connected to said setting means to receive therefrom the analog video signal with the DC level at different values.

* * * * *